United States Patent
Radulescu et al.

(10) Patent No.: US 8,495,404 B2
(45) Date of Patent: Jul. 23, 2013

(54) METHOD AND APPARATUS FOR ADAPTIVE BLUETOOTH LOW POWER DISCOVERY AND WAKE UP

(71) Applicant: QUALCOMM Incorporated, San Diego, CA (US)

(72) Inventors: Andrei Dragos Radulescu, San Diego, CA (US); Peter Hans Rauber, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/644,601

(22) Filed: Oct. 4, 2012

(65) Prior Publication Data

US 2013/0028162 A1 Jan. 31, 2013

Related U.S. Application Data

(62) Division of application No. 12/620,588, filed on Nov. 17, 2009, now Pat. No. 8,307,231.

(60) Provisional application No. 61/116,282, filed on Nov. 19, 2008.

(51) Int. Cl.

| | |
|---|---|
| *G06F 1/00* | (2006.01) |
| *G06F 1/26* | (2006.01) |
| *G06F 15/16* | (2006.01) |
| *G08B 1/08* | (2006.01) |
| *H04B 7/00* | (2006.01) |
| *H04M 1/00* | (2006.01) |

(52) U.S. Cl.
USPC ...... 713/323; 713/300; 713/320; 340/539.13; 370/310; 455/574; 709/227

(58) Field of Classification Search
USPC ...... 713/300, 320, 323; 340/539.13; 370/310; 455/574; 709/227
See application file for complete search history.

(56) References Cited

U.S. PATENT DOCUMENTS 6,571,103 B1 * 5/2003 Novakov ............ 455/464
7,398,408 B2 7/2008 Paljug (Continued)

FOREIGN PATENT DOCUMENTS

WO WO2006038094 4/2006

OTHER PUBLICATIONS

International Search Report & Written Opinion—PCT/US09/065025, International Search Authority—European Patent Office—Feb. 3, 2010.

(Continued)

*Primary Examiner* — Stefan Stoynov
(74) *Attorney, Agent, or Firm* — Stanton Braden

(57) ABSTRACT

Disclosed is a method of low power discovery (LPD) that extends the battery life of a portable Wi Fi device or portable media player (PMP) using an IEEE 802.11 interface. Battery life extension is effected by ensuring that a PMP host processor is only on when in designated 802.11 coverage or when needed by a user by employing probabilistic channel scanning. The method includes bringing an access terminal host equipped with an 802.11 interface to an advanced configuration and power interface (ACPI) state S3 or an equivalent sleep state prior to the device or PMP going to sleep. Additionally, the method includes programming a Bluetooth (BT) device at the access terminal is to look for a certain IAC (inquiry access code), whereupon finding this IAC, the access sends a Bluetooth inquiry directing an access point (AP) to wake-up the device or PMP via a wake-up packet.

12 Claims, 8 Drawing Sheets

U.S. PATENT DOCUMENTS

| | | |
|---|---|---|
| 7,457,953 B2 | 11/2008 | First et al. |
| 7,558,227 B2 | 7/2009 | Doragh et al. |
| 7,962,921 B2 | 6/2011 | James et al. |
| 8,307,231 B2 | 11/2012 | Radulescu et al. |
| 2006/0128308 A1 | 6/2006 | Michael et al. |
| 2007/0037547 A1 | 2/2007 | Cheol |
| 2007/0143499 A1 | 6/2007 | Chang |
| 2007/0224981 A1 | 9/2007 | Youn |
| 2007/0287418 A1 | 12/2007 | Reddy |
| 2009/0061770 A1* | 3/2009 | Agardh ................ 455/41.2 |

OTHER PUBLICATIONS

Taiwan Search Report—TW098139360—TIPO—Nov. 9, 2012.

* cited by examiner

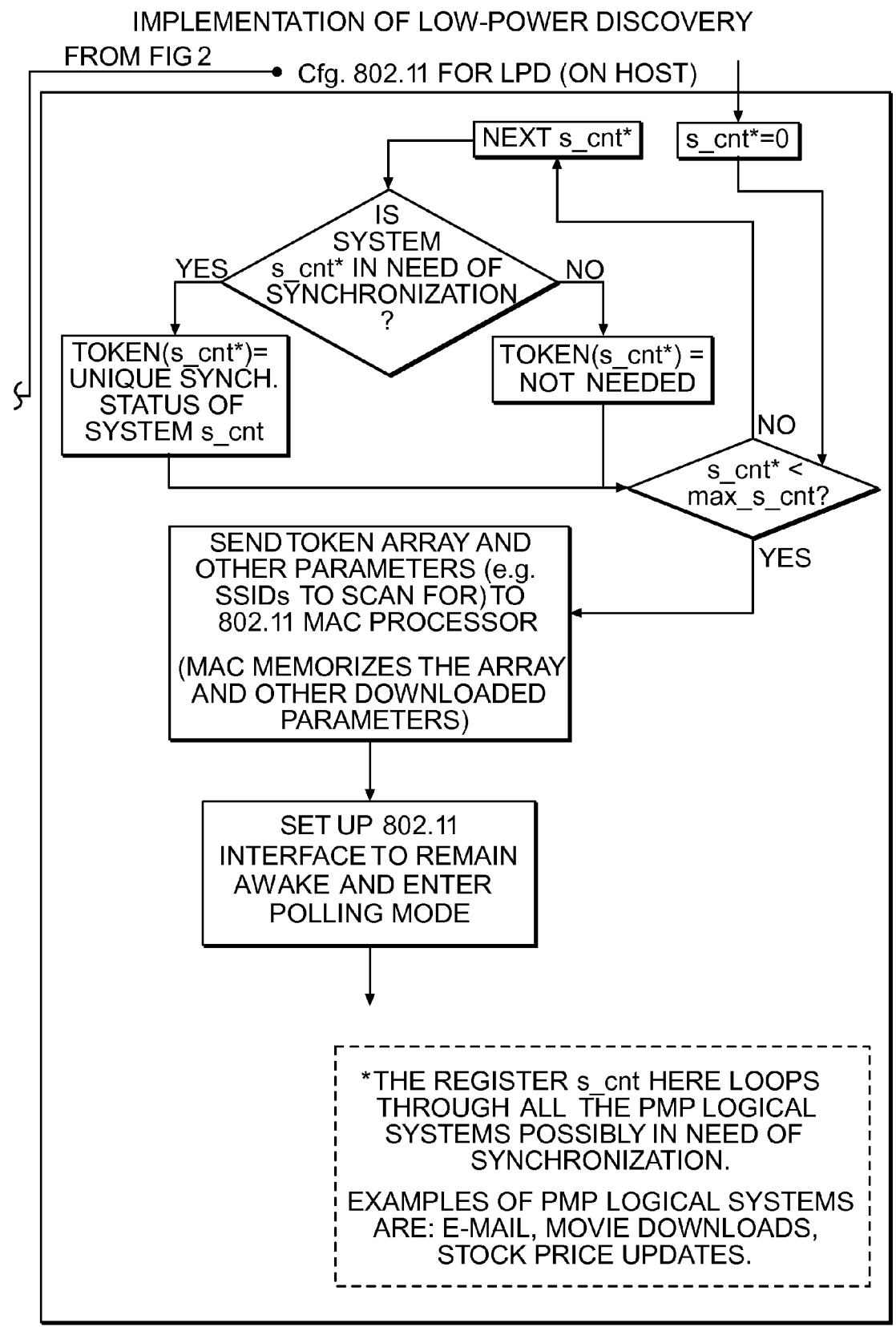
FIG. 2 (CONT')

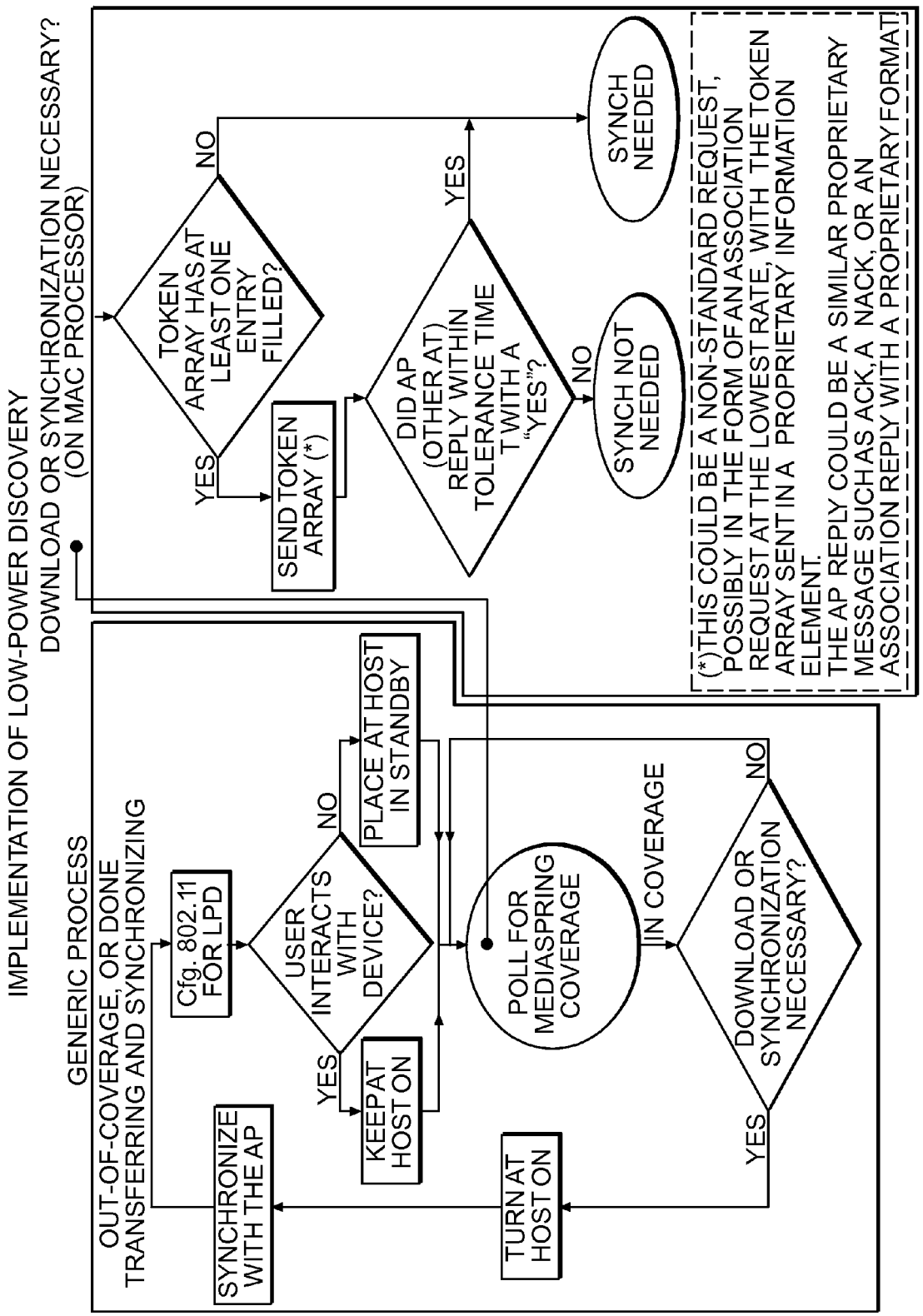

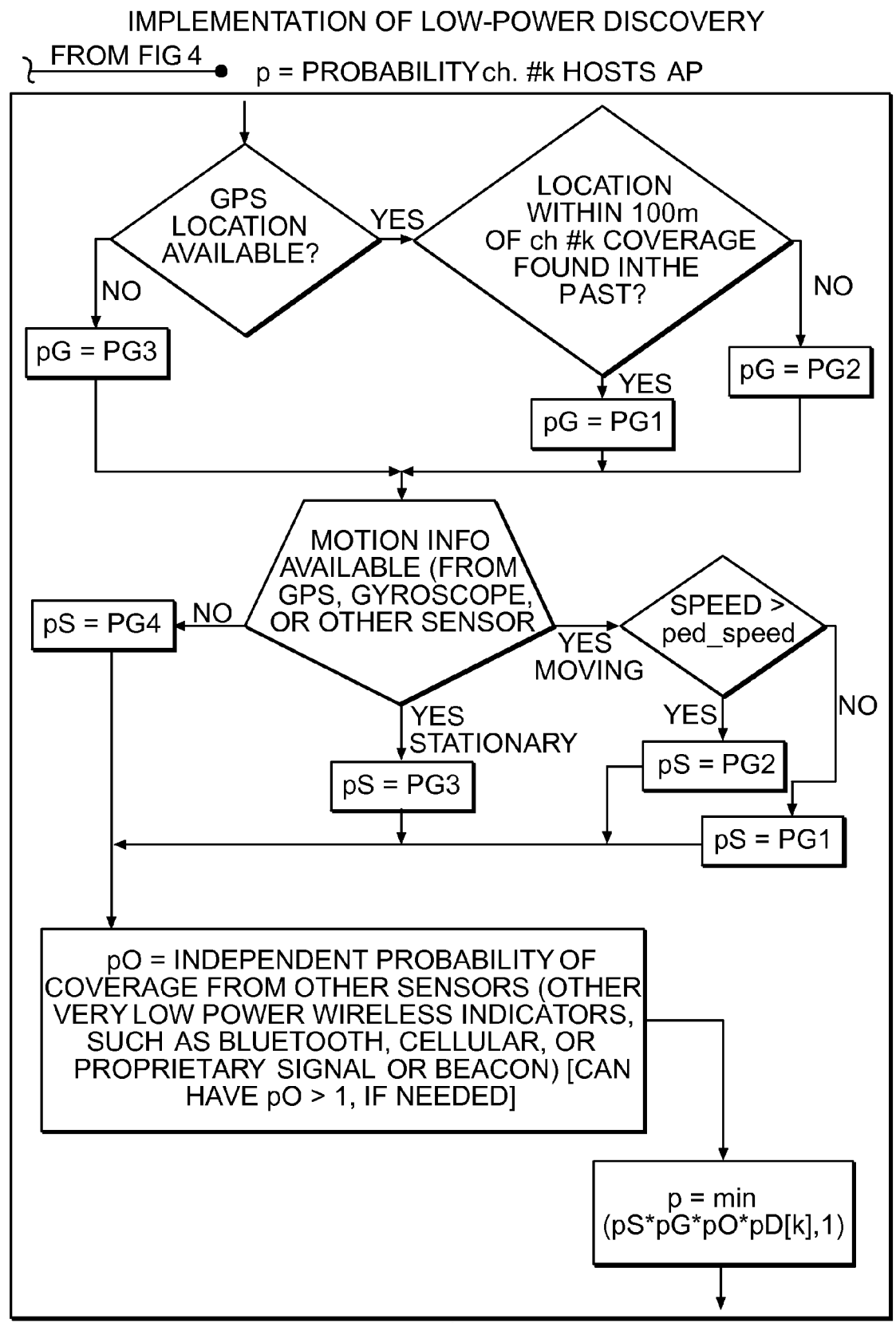
FIG. 4 (CONT')

METHOD AND APPARATUS FOR ADAPTIVE BLUETOOTH LOW POWER DISCOVERY AND WAKE UP

The present application is a Divisional Application of U.S. patent application Ser. No. 12/620,588 entitled, "METHOD AND APPARATUS FOR ADAPTIVE BLUETOOTH LOW POWER DISCOVERY AND WAKE UP", filed Nov. 17, 2009, and to U.S. Provisional Application No. 61/116,282 entitled, "METHOD AND APPARATUS FOR ADAPTIVE BLUETOOTH LOW POWER DISCOVERY AND WAKE UP", filed Nov. 19, 2008, and assigned to the assignee hereof and is hereby expressly incorporated by reference herein.

BACKGROUND

I. Field

The present disclosure relates generally to extension of battery life in wireless communication systems, and more particularly to extension of battery lifetime in Bluetooth equipped wireless communication devices.

II. Background

Battery lifetime is a chief concern in portable Bluetooth 802.11 computing devices, such as Ultra Mobile Personal Computers (UMPCs) and Personal Digital Assistants (PDAs). It is known that battery lifetime can be extended by keeping the host processor asleep whenever possible. It is useful for such computer devices to be aware when they enter 802.11 coverage, and wake-up the host processor, if needed, thereby eliminating the need for the user to manually check for coverage.

In this connection, wake-up conditions must be sophisticated, varying from the existence of a network to complex conditions such as the existence of an urgent e-mail, availability of a particular kind of service, etc.

However, traditional wake-up solutions require the existence of alternative interfaces other than 802.11 to initiate wake-up, the presence of full-blown additional processors, or host processor hierarchies for wake-up initiation. Further, some solutions restricted to 802.11-based wake-ups are extremely inflexible (such as WoWLAN and AMD Magic packet). Moreover, traditional host processor wake-up conditions are not variable from application to application, which often change according to complex user requirements, such as the need to be notified of urgent e-mails, existence of a particular service, existence of a particular network and so forth. Current 802.11-initiated wake-up methods are very rigid and limiting.

U.S. Pat. No. 7,398,408 disclose methods for accessing computing devices over wireless local area networks and more particularly to systems and methods for waking computing devices from a powered down or sleep state with signals sent over wireless local area networks. This is accomplished by:

broadcasting a signal containing a wake-up data sequence for at least one computing device over a wireless network, wherein broadcasting the signal comprises periodically broadcasting the signal over one or more wireless channels until either a first predetermined time period expires or a confirmation signal is received;

receiving the broadcast signal at the at least one computing device, while that device is in a reduced power mode; wherein receiving comprises first entering a wake-up data sequence detection mode;

scanning the received signal for a wake-up data sequence for that computing device, wherein scanning is performed until either the wake-up data sequence for that computer device is received or a second predetermined time period expires; and restoring that computing device to a full power mode upon detection of a wake-up data sequence for that device and exiting the wake-up data sequence detection mode if the second predetermined time period expires.

There is a need for an infrastructure system where 802.11 ATs are only awake when interaction with the AP is needed and possible, and asleep (in standby) otherwise.

There is also a need to provide a flexible mechanism whereby the AT's 802.11 interface can detect when "interaction with the AP Is needed" as possible.

SUMMARY

One aspect is to provide an infrastructure system where 802.11 ATs only awake when interaction with the AP is needed and possible, and asleep (in standby) otherwise.

Another aspect is provide or define a flexible mechanism whereby the AT's 802.11 interface can detect when interaction with the AP is needed.

A further aspect is to provide or define as functions of triggers the 802.11 identity coverage, SSIO, and application-specific events.

The extension of battery lifetime in Bluetooth equipped wireless communication devices is obtained by identifying triggers that may or may not require AP cooperation, and the innovation provides a flexible firmware mechanism whereby such triggers can be dynamically uploaded to the firmware when the AT host is awake and verified when the AT host is asleep.

BRIEF DESCRIPTION OF THE DRAWINGS

FIG. 3 are flow charts depicting comparison of a generic process with that of another aspect of the implementation of the low-power discovery of the present innovation.

DETAILED DESCRIPTION

Figure 1:
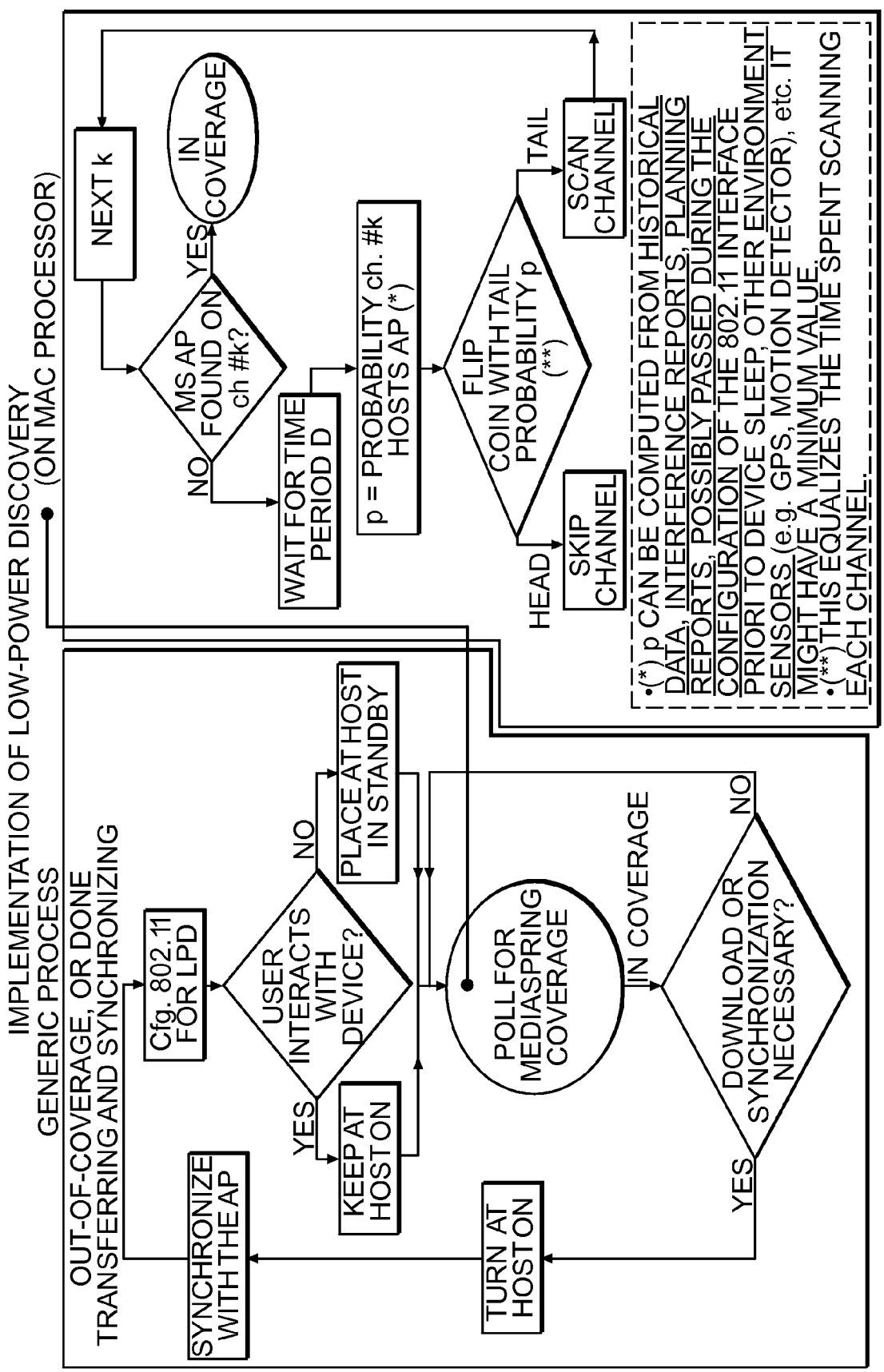
FIG. 1 are flow charts depicting comparison of a generic process with that of one aspect of the implementation of the low power discovery of the present innovation.

The word "exemplary" is used herein to mean "serving as an example, instance, or illustration." Any embodiment described herein as "exemplary" is not necessarily to be construed as preferred or advantageous over other embodiments.

A subscriber station, referred to herein as an access terminal (AT), may be mobile or stationary, and may communicate with one or more base stations, referred to as modem pool transceivers (MPTs). An access terminal transmits and receives data packets through one or more modem pool transceivers to an HDR base station controller, referred to herein as a modem pool controller (MPC). Modem pool transceivers and modem pool controller are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic connection with one or more modem pool transceivers is called an active access terminal, and is said to be in a traffic state, and is said to be in a traffic state. An access terminal that is in the process of establishing an active traffic channel connection with one or more modem pool transceivers is said to be in a connection setup state. An access terminal may be an data device that communicates through a wireless channel or through a wired channel, for example using fiber optic or coaxial cables. An access terminal may further be any of a number of types of devices including but not limited to PC card, compact flash, external or internal modem, or wireless or wire line phone. The communication link through which the access terminal sends signals to the modem pool transceiver is called a reverse link. The communication link through which a modem pool transceiver sends signals to an access terminal is called a forward link.

In essence, the method for adaptive Bluetooth low power wake up and discovery is provided whereby, wake-up triggers are uploaded to Media Access Control (MAC) firmware, through the means of a data stream. The data stream representing the trigger arrives in the form of either an interpretable binary stream of instructions, or as a concatenation of events listed in a preset table. Various parameters allowing flexible wake-up triggering, such as Service Set Identifiers (SSIDs) to scan for probability likelihoods, are also upload. Both table-based and interpretable instructions code are designed to ensure the security of the trigger, by limiting the functionality of the trigger to only trigger-related events (e.g. scanning, pre-reserved memory). Both the table and the instruction set are designed in a minimalistic fashion to allow a slim and fast firmware-side implementation. The embodiments require insignificant modifications to existing computer or Operating System (OS) architecture, to take advantage of the already existing MAC processor in many 802.11 interfaces, and therefore offer very large flexibility.

Battery lifetime is a chief concern in portable 802.11 devices, and the innovation provides a wakeup process that extends the lifetime by increasing the probability that the Wi Fi device is turned on only when there is an appropriate 802.11 AP nearby that is able to provide the desired services (such as e-mail verification, downloads, etc).

In general, the method utilizes an AT host equipped with an 802.11 interface that is brought to an ACPI (advanced configuration and power interface) state S3 (standby, in Windows, for instance) or equivalent sleep state when it is deemed that:
1) the 802.11 interface is idle (e.g., download finished, watchdog timer expired since last in coverage or since last user input, etc.)
2) the host has been idle for a while
Before going to sleep, the host PMP (portable medium player) either by:
A) programming the 802.11 WLAN to wake it up based on some predetermined trigger; or
B) programming a Bluetooth [BT] device at the AT to look for a certain IAC (inquiry access code); upon finding the IAC, the AT sends a BT inquiry reply directing the AP to wake the PMP via a wake-up packet (such as a magic packet or other suitable method).

Exemplary Method A

With regard to this method, a trigger to wake up the AT host is obtained by scanning all 802.11 channels (in the 2.4 or 5 GHz bands) that looks for the criteria:
Desired SSID;
Desired encryption;
Special packet format (from AP)
wake-up necessity (through a synchronization token)
The synchronization token is unencrypted, to accommodate limited MAC processor capability:
if so, it should not be part of security credentials and
the token is sent by the AT to the AP when desired 802.11 coverage is found.
The AT's MAC address allows the AP to wake-up only specific ATs, on the basis of the need for wake-up, as determined after analyzing the AT's synchronization token.
Channels are then scanned probabilistically, based on one or more of the following:
history of found channels or triggers;
pre-programmed trigger information downloaded from the server;
information from other sensors (GPS, Bluetooth, Gyroscope, Odometer, Cellular signal) pertaining to the likelihood of an 802.11 channel
During the LPD (low power discovery) configuration [prior to the host going into standby], the host updates the synchronization token and downloads it to the MAC processor. The token then marks:
a level of download that has been reached;
changes in some download list; and
latest retrieved e-mail
Thereafter, trigger logic is implemented in the MAC processor firmware, which is found in modern 802.11 interfaces (e.g. Intel 4965AGN, Atheros 9280/9281, Qualcomm Libra).

Exemplary Method B

With regard to method B, a BT (Blue Tooth) inquiry from the BT-equipped AP is sent to advertise the availability of the 802.11 AP, as well as (optionally) the AP's channel.
The inquiry can be sent in various forms, such as:
1) a Dedicated Inquiry Access Code [DIAC], with its Lower Access Portion [LAP] corresponding to an unusual device; or
2) a special kind of Inquiry Access Code [IAC], neither General [GIAC], nor dedicated, by using a special Most Significant Bits [MSB] field
The 802.11 channel is optionally sent in a BT data packet with the IAC
3) the PMP firmware tunes the 802.11 interface to the advertised AP channel
4) if no 802.11 channel information is sent by the AP, the PMP firmware has the option of either (i) waking up the host processor and handling 802.11 channel scanning to it or (ii) using a BT packet to send a synchronization token to the AP, along with the AT's 802.11 channel number
5) If the AP's initial inquiry included a packet number, or the PMP firmware follows option (ii) above, the firmware on the PMP (AT) sends either:
a BT inquiry reply, informing the AP of the PMP's vicinity, followed by an optional synchronization token packet through a regular BT packet or an 802.11 packet [on the specified channel] (in the form of an association request), with the a synchronization token 6) The AP then targets [depending on the synchronization token] a wakeup packet (such as a magic packet) to the PMP's 802.11 interface 7) To target the wake-up packet, the AP uses the PMP's MAC address (or whatever unique identifier is decided upon by the designer)

8) the 48-bit MAC address (or other pattern to match) for the wakeup packet has been sent by this time either through the BT inquiry reply in the LAP+UAP+NAP fields (48 bits)] OR through the MAC address field of the standard 802.11 association request frame.

As can be seen from the comparison of a generic process with that of one aspect of the implementation of the low power discovery of FIG. 1 $p$ can have a minimum value as computed from historical data, interference reports, and planning reports, passed during configuration of the 802.11 interface priori to device sleep, and environmental sensors (i.e. GPS, motion detections, etc). Also, it may equalize the time spent scanning each channel.

Figure 2:
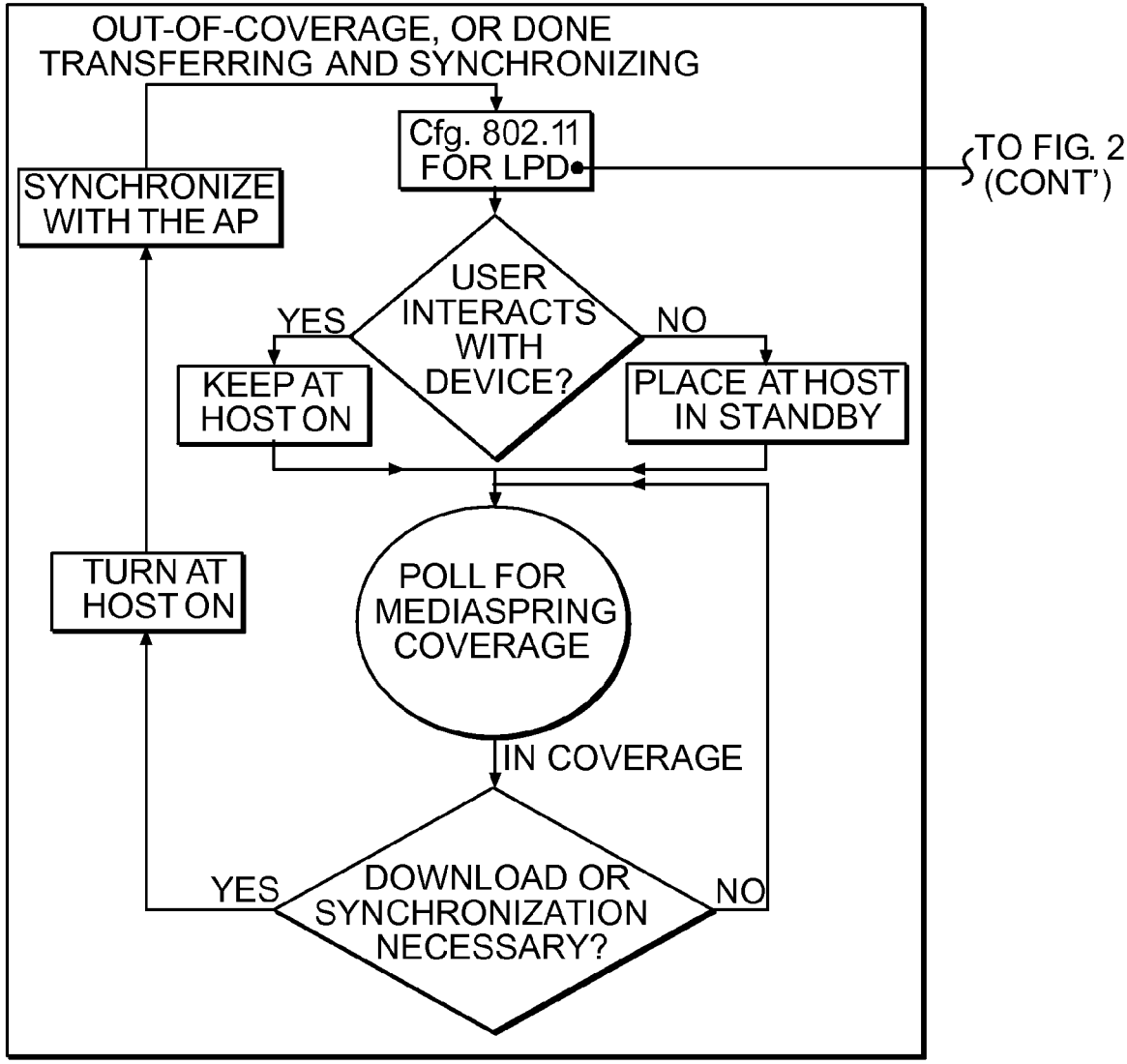
FIG. 2 are flow charts depicting comparison of a generic process with that of an aspect of the implementation of the low-power discovery of the present innovation.

From the comparison of a generic process with that of an aspect of the implementation of the low power discovery in FIG. 2 it can be seen that the register s_cnt loops through all the PMP logical systems in need of synchronization. Examples of PMP logical systems are: e-mail, movie downloads, stock price updates, etc.

In the comparison of a generic process with that of an aspect of the implementation of the low-power discovery of the present innovation in FIG. 3, the send token array is a non-standard request in the form of an association request at the lowest rate, with the token array sent in a proprietary information element. The AP reply is a similar proprietary message such as ACK, a NACK, or an association reply with a proprietary format.

Figure 4:
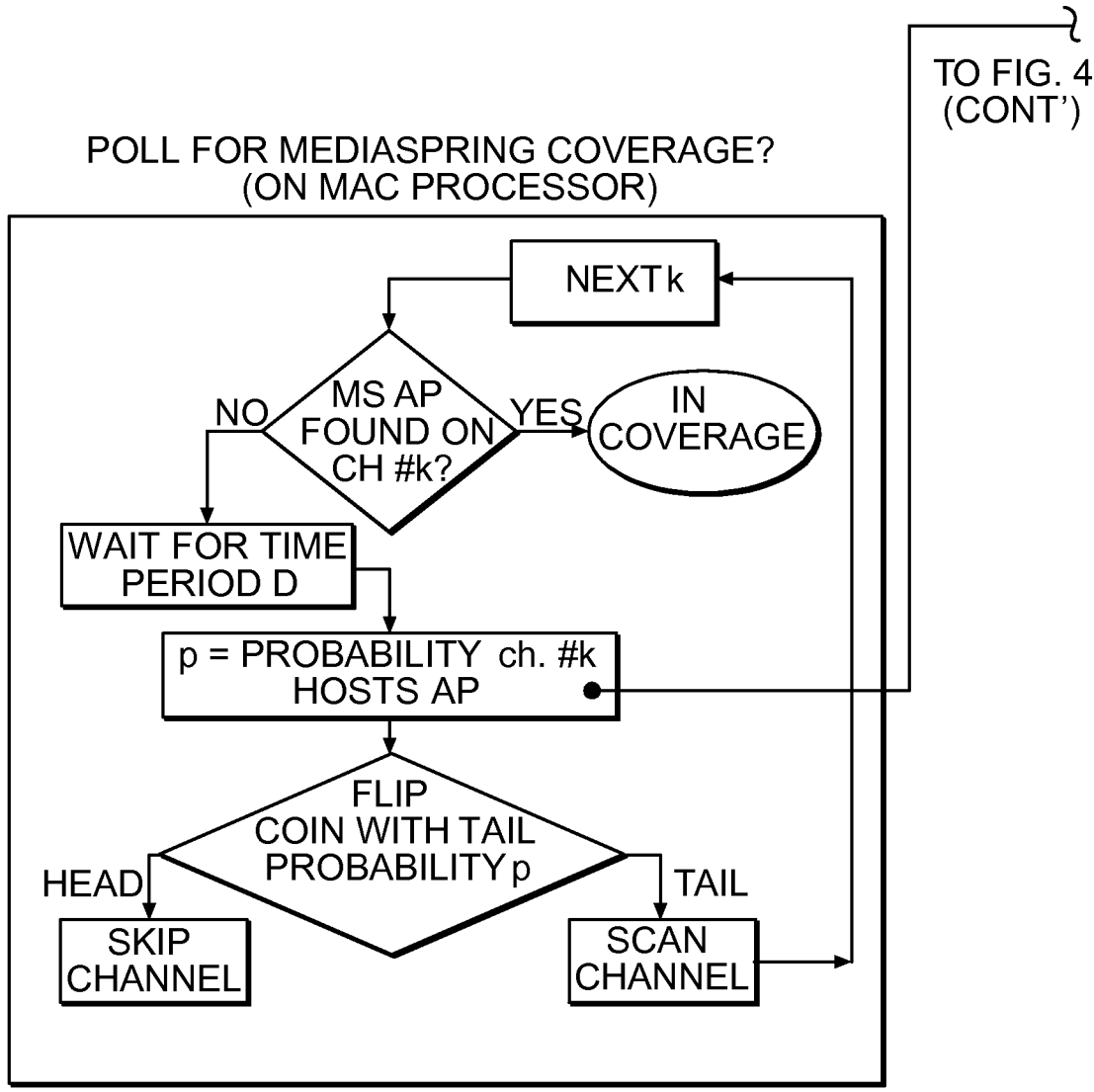
FIG. 4 are flow charts showing the interconnection of the implementation of the low-power discovery of the present innovation on a MAC processor with regard to p=probability ch #k host AP.

In the implementation of the low power discovery innovation in FIG. 4, where p=probability ch.# k hosts AP, p0=independent probability of coverage from other sensors (very low power wireless indicators, such as Bluetooth, cellular, or proprietary signal or beacon, where p o>1, if needed.

Figure 5:
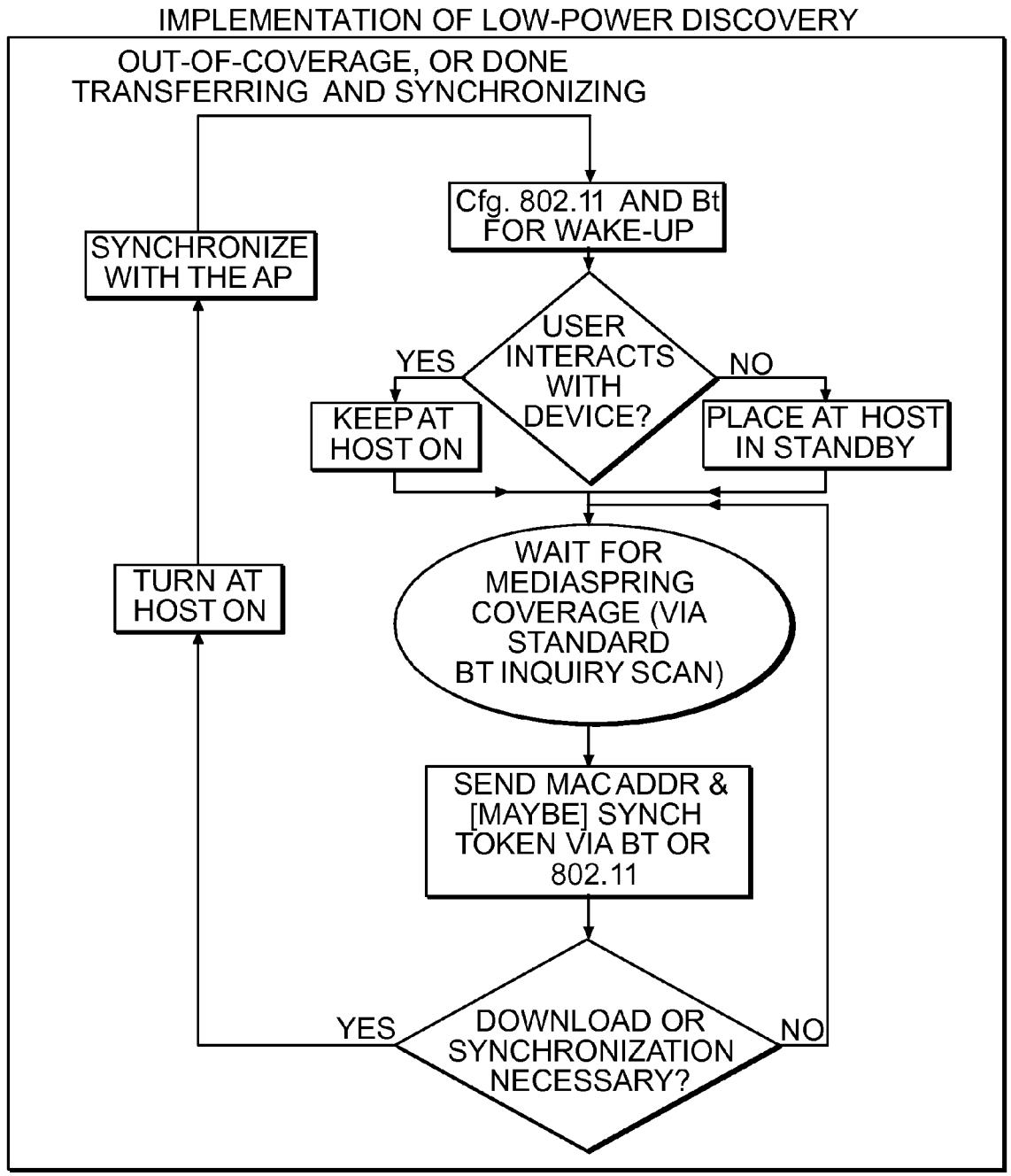
FIG. 5 is a flow chart showing yet another aspect of the implementation of low-power discovery of the present innovation.

In the implementation of the low power discovery process of FIG. 5, even when out of coverage, the PMP host processor may still be awake during the LPD, due to the user interacting with the PMP (reading e-mails, seeing movies, etc.). The user may be a third-party peripheral or software that required the host to be awake.

Figure 6:
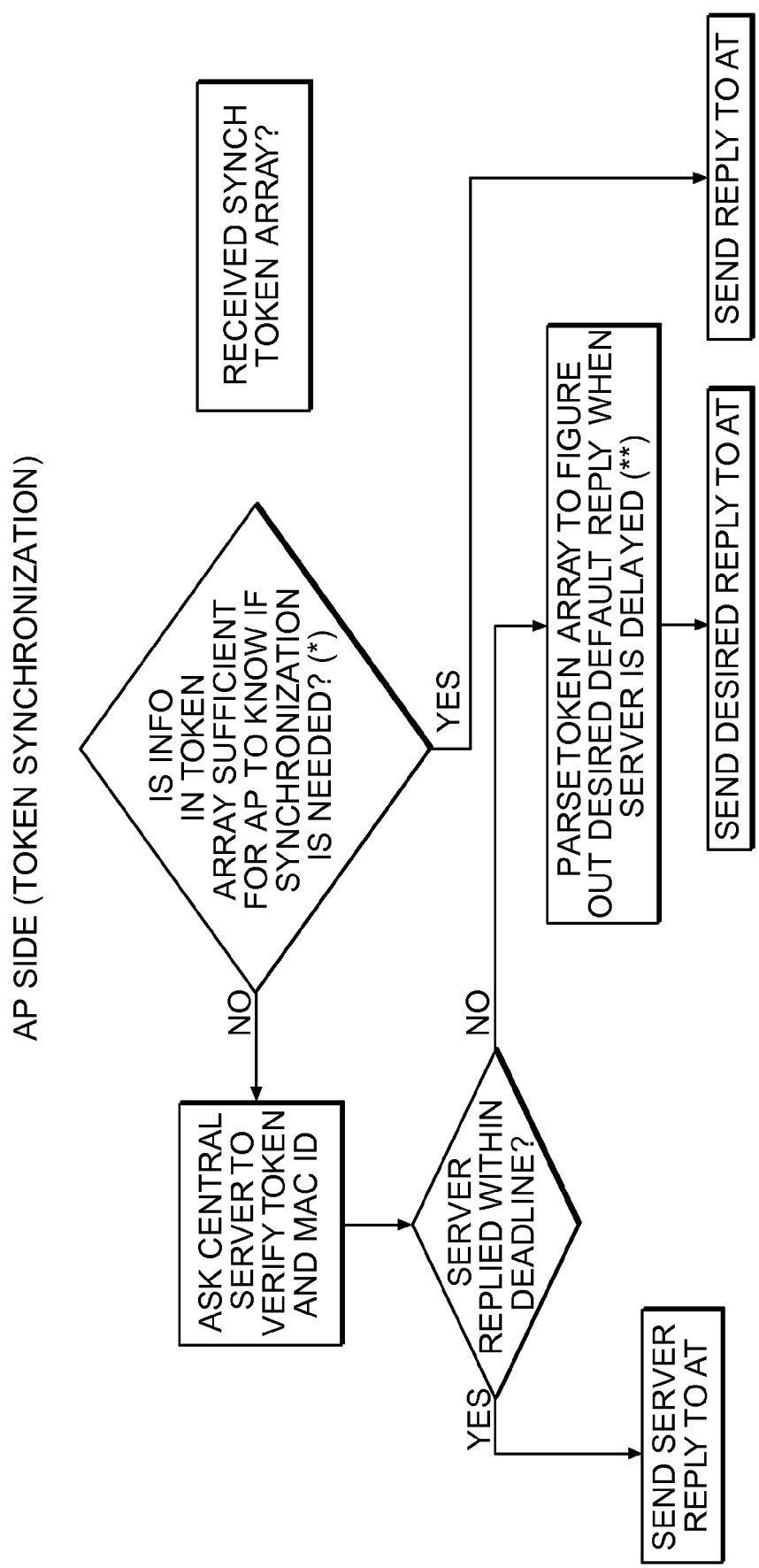
FIG. 6 is a flow chart showing a still further aspect of innovation in relation to AP side (token synchronization).

In the flow chart showing the AP side (token synchronization) of FIG. 6, the asterisk * denotes, for instance that a movie needs to be downloaded and is available at the AP storage place. In this connection, a desired reply can be coded exclusively inside the token array, or default behavior may be known to (or overridden by) the AP. If urgent e-mails are expected, the AT can be woken up even if the server cannot reply in time. If the viewer already has one unviewed movie downloaded, the AT should not be woken up unless there is a certainty that a second movie is available for download.

In the foregoing implementations, the LPD process runs regardless of whether the host processor is on or in standby. Further, when exiting the 802.11 coverage, the LPD procedure starts regardless of whether the host processor can or cannot be put in standby mode, (i.e. the host processor may still enter standby at some later point, after—for instance—a watchdog timer monitoring user activity expires).

Accordingly, the process whereby a host may enter or exit standby runs asynchronously from the LPD process.

Moreover, the only interaction between the two processes (LPD and host standby/on status) occurs when:
a) desired coverage is exited (then the LPD process places the processor in standby if nothing else compels the host to remain on); and
b) desired coverage is detected (then the LPD process turns the host processor on, if it is not already on, and notifies it of the found coverage).

Other than being awake when synchronizing with the AP, the host may or may not be in standby at any point, as required by user interaction. Nevertheless, the LPD process ensures that the host is in standby whenever possible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method of low power discovery (LPD) for extending the battery life of a portable Wi Fi device or portable media player (PMP) using IEEE 802.11 interface by ensuring that the PMP host processor is only on when in designated 802.11 coverage or when needed by a user, by employing probabilistic channel scanning comprising:
- A) bringing an access terminal (AT) host equipped with an 802.11 interface to an advanced configuration and power interface (ACPI) state S3 or equivalent sleep state prior to said portable Wi Fi device or PMP going to sleep;
- B) programming a Bluetooth (BT) device at the AT host to look for a certain IAC (inquiry access code), whereupon finding said IAC, the AT host sends a BT inquiry reply directing an access point (AP) to wake-up said portable Wi Fi device or PMP via a wake-up packet.

2. The method of claim 1, wherein said wake-up packet is a magic packet-ready motherboard.

3. The method of claim 1, wherein said BT inquiry reply is sent to advertise the availability of the 802.11 AP.

4. The method of claim 3, wherein said inquiry reply is sent as a dedicated inquiry access code (DIAC), with its lower access portion (LAP) corresponding to an unusual device.

5. The method claim 1, wherein said IAC is sent by using a most significant bits (MSB) field.

6. The method of claim 1, wherein the 802.11 channel is sent in a BT data packet.

7. The method of claim 6, wherein PMP firmware tunes the 802.11 interface to the advertised AP channel.

8. The method of claim 7, wherein if no 802.11 channel information is sent by the AP, the PMP firmware has the option of:
- i) waking up the host processor and handing 802.11 channel scanning to it, or
- ii) using a BT packet to send a synchronization token to the AP, along with the AT host's 802.11 channel number.

9. The method of claim 8, wherein, if the IAC included a packet number, or the PMP firmware follows option ii), and the PMP firmware sends either:
- iii) the BT inquiry reply, informing the AP of the PMP's vicinity, followed by an optional synchronization token packet through a regular BT packet or
- iv) an 802.11 packet on the specified channel in the form of an association request, with the a synchronization token.

10. The method of claim 9, wherein after step iv) the AP targets a wakeup packet to the PMP's 802.11 interface.

11. The method of claim 10, wherein, to target the wakeup packet, the AP uses the PMP's MAC address.

12. The method of claim 11, wherein a 48-bit MAC address for the wakeup packet has been sent by this time, either:
- a) through the BT inquiry reply in the LAP+UAP+NAP fields, or
- b) through the MAC address of the standard 802.11 association request frame.

* * * * *